United States Patent [19]
Mare

[11] 3,745,745
[45] July 17, 1973

[54] SCRUBBING APPARATUS AND METHOD

[76] Inventor: Ernest Mare, c/o Jack Melvin, Kreb Engineering, 1205 Chrysler Drive, Menlo Park, Calif. 98025

[22] Filed: Jan. 28, 1972

[21] Appl. No.: 221,638

[52] U.S. Cl. .................. 55/95, 55/244, 261/119 R
[51] Int. Cl. ........................................... B01d 47/02
[58] Field of Search .................. 55/95, 244, 248, 55/249; 261/119 R

[56] References Cited
UNITED STATES PATENTS

| | | | |
|---|---|---|---|
| 3,524,631 | 8/1970 | Mare | 261/119 R |
| 2,061,344 | 11/1936 | Bingman | 261/119 R X |
| 3,456,928 | 7/1969 | Selway | 55/248 X |
| 2,004,467 | 6/1935 | Hawley | 55/95 X |

*Primary Examiner*—Samih N. Zaharna
*Assistant Examiner*—Richard W. Burks
*Attorney*—Paul D. Flehr et al.

[57] ABSTRACT

An apparatus and method for scrubbing gases with liquid. The apparatus employs a plurality of nozzles which discharge several streams of the gas downwardly against the surface of the scrubbing liquid (e.g., water). Each nozzle has a shield which overlies the liquid body and confines the movement of gas and entrained liquid from the region of impingement with the liquid. The nozzles and their shields are arranged in a cluster within a reservoir. In carrying out the method, the gas flow is discharged from the several nozzles and caused to impinge on the surface of the liquid, the flow velocity being such that depressions are formed in the liquid body immediately below the nozzles. Some initial scrubbing action is effected by such impingement, and the impingement causes some of the liquid to be entrained in the gas flow whereby a gas-liquid mixture flows outwardly in a radial direction from the region of each depression and through the spaces underlying the shields. Also, the gas-liquid mixture discharging from the region of each depression is caused to intermingle with the gas-liquid mixture discharging in an opposite direction from at least one adjacent nozzle, thereby causing further turbulence and scrubbing action. This invention relates generally to an apparatus and method for subjecting air and other gases to scrubbing with water or other liquid.

5 Claims, 5 Drawing Figures

SCRUBBING APPARATUS AND METHOD

BACKGROUND OF THE INVENTION

In So. African Patent 66/7061 entitled "Improved Means for Carrying Out Gas Scrubbing Operations", there is disclosed scrubbing apparatus making use of a nozzle disposed in the upper part of a reservoir that is adapted to contain a body of scrubbing liquid underlying the nozzle. The nozzle is provided with an annular shield mounted near the lower end of the nozzle and spaced above the liquid surface. The gas to be scrubbed is discharged downwardly through the nozzle and caused to impinge upon the surface of the liquid. This causes the surface of the liquid to be depressed, and gas with entrained liquid is caused to discharge in a general radial direction from the region of the depression and through the space underlying the shield. In some instances an impingement screen is provided which depends from the periphery of the shield. Suitable means such as an overflow weir is provided for maintaining the level of the liquid body substantially constant.

The scrubbing apparatus described above is effective for performing various gas scrubbing operations, as for example, for the removal of entrained dust solids from flue gases. However, when units are constructed for the higher flow capacities the apparatus becomes relatively expensive and considerable space is required for installation. Also the separating efficiency, while relatively good compared to many other types of conventional gas scrubbers, is relatively inefficient compared to the efficiency obtained by the present invention.

In the above described prior apparatus, the scrubbing or separating action takes place by virtue of impingement of gas against the surface of the liquid body, and particularly against the surface of the depression formed in the body. Also scrubbing takes place by virtue of intermixture of gas with entrained liquid in the confined space below the shield. The present invention is predicated upon the discovery that improved scrubbing action can be obtained when the gas flow is divided into a plurality of streams which are directed downwardly against the surface of the liquid body, and particularly when the apparatus is constructed to provide a cluster of nozzles, each with its individual shield. As will be present explained, one of the principles involved is that the combined perimeter of a plurality of discharging nozzles of a given cross-sectional flow area is substantially greater than the perimeter of a single nozzle of the same cross-sectional flow area, and extended perimeter length by use of a plurality of nozzles promotes scrubbing efficiency.

Further, the combined surface area of depressions made by the same volume of gas passing through a cluster of nozzles as above described is considerably larger than the surface area of the single depression caused by the same gas flow through one nozzle of equivalent discharge area.

SUMMARY OF THE INVENTION AND OBJECTS

In general, it is an object of the present invention to provide novel gas scrubbing apparatus which is superior in many respects to the apparatus and method disclosed in said South African patent.

Another object of the invention is to provide a gas scrubbing apparatus which for a given capacity is relatively compact and economical to manufacture.

Another object of the invention is to provide a gas scrubbing apparatus and method which is characterized by superior separating action.

Another object of the invention is to provide apparatus of the above character which requires relatively low power consumption for a given capacity.

Additional objects and features of the invention will appear from the following description in which the preferred embodiments have been set forth in detail in conjunction with the accompanying drawing.

BRIEF DESCRPTION OF THE DRAWING

DESCRIPTION OF THE PREFERRED EMBODIMENTS

Figure 1:
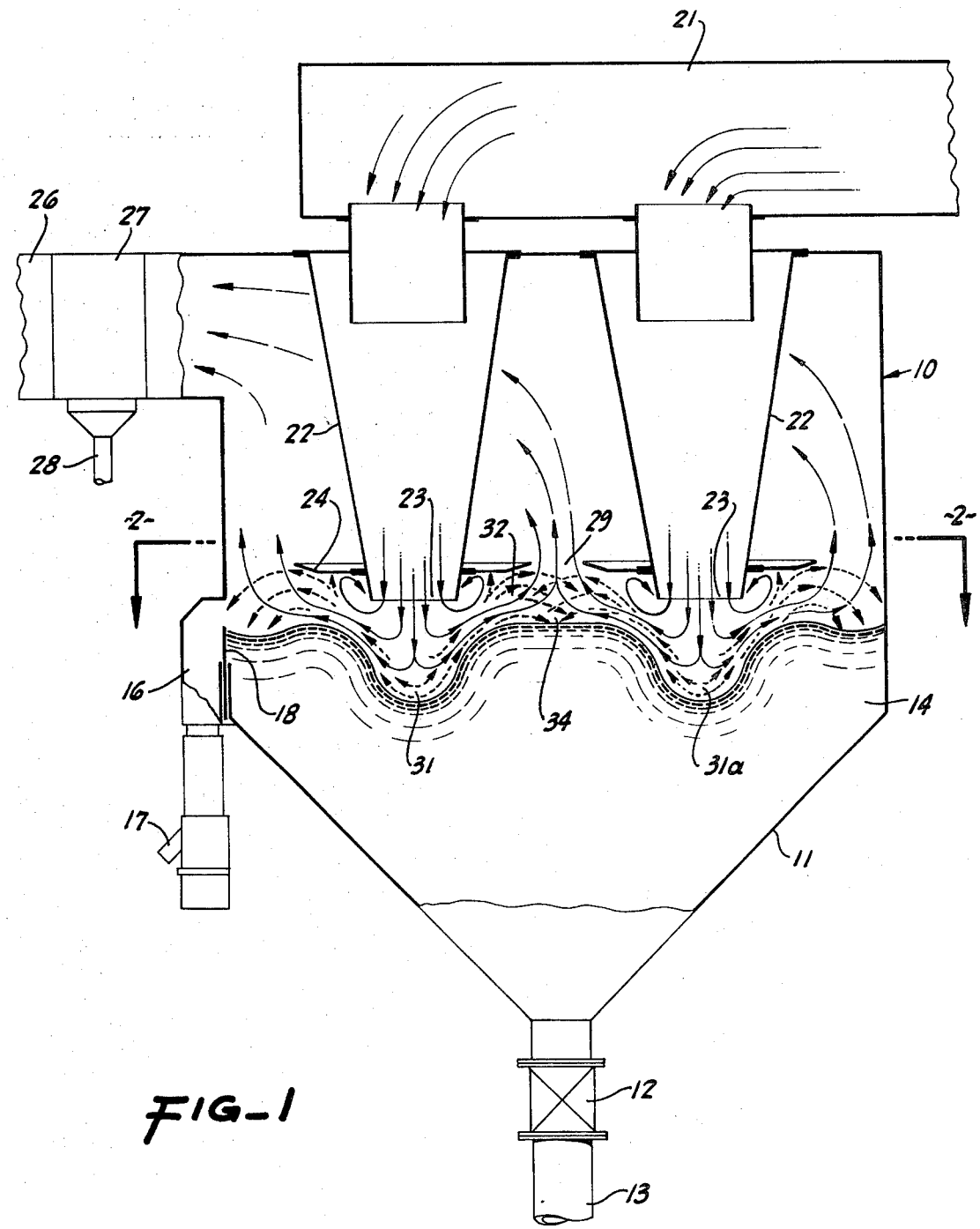
FIG. 1 is a side elevational view in section schematically illustrating apparatus incorporating the present invention.

The apparatus illustrated in FIG. 1 consists of a reservoir 10 which is shown provided with a conical shaped lower portion 11 to facilitate the settlement and removal of solids. The lower end of the reservoir is shown connected to a drain pipe 13 which may be provided with the valve 12. In operation a body of liquid 14 is maintained in the reservoir.

Suitable means is provided for maintaining the level of the liquid body substantially constant. For example, liquid may be bled into the body through a float valve which automatically supplies additional fluid when the level falls. As another expedient for this purpose, the reservoir can be provided with an overflow box 16 connected to the drain pipe 17, together with an adjustable weir 18 which controls flow of liquid into the box.

The gas flow to be subjected to scrubbing is introduced into the manifold 21 which in turn communicates with the downwardly directed nozzles 22 within the upper part of the reservoir. It is desirable but not essential that these nozzles be conical shaped as illustrated. The lower open end of each nozzle is spaced a short distance above the surface of the liquid body 14. An annular shield 24 is mounted upon the lower end of each nozzle, preferably a short distance above the lower end 23. These shields are dished with their concave sides faced upwardly and each shield serves to provide an upper confining wall for the space underlying the same.

The upper part of the reservoir 10 connects with a gas discharge conduit 26. A suitable liquid eliminator 27 can be provided for removing entrained liquid from the gas flow, and liquid so removed may be drained back to the reservoir 10 through pipe 28.

Figure 2:
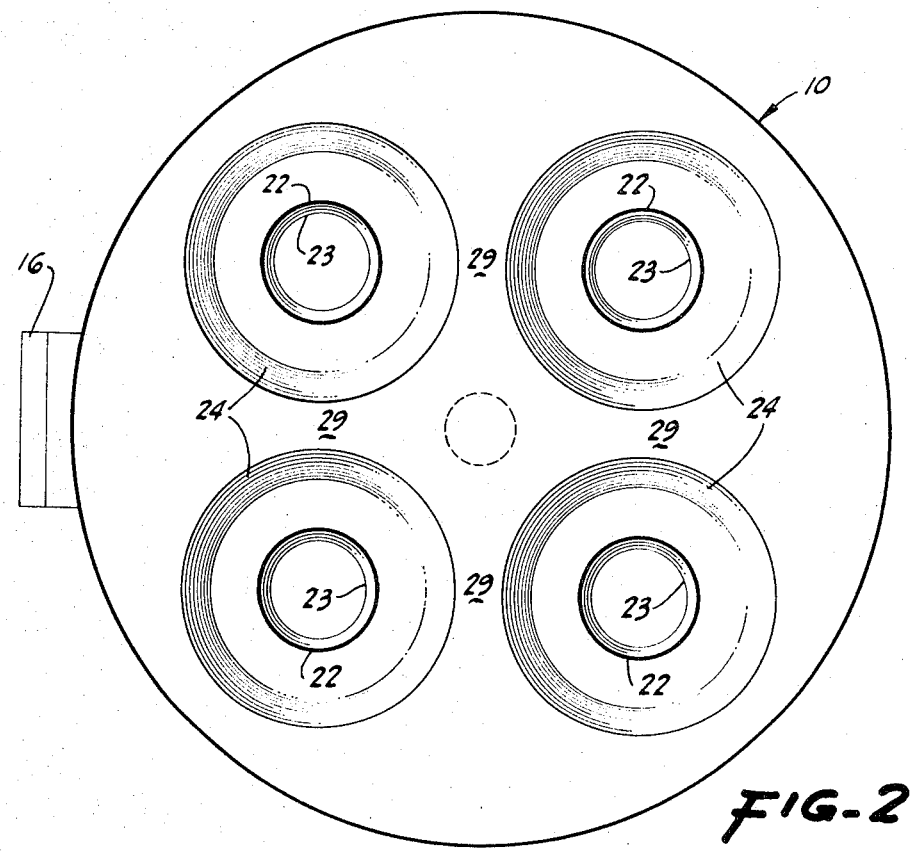
FIG. 2 is a cross-sectional view in section taken along the line 2 — 2 of FIG. 1.

It is desirable to arrange the nozzles 22 in the form of a cluster. FIG. 2 illustrates a cluster consisting of four such nozzles disposed with their axes parallel and vertical and with the shields 24 spaced apart as indicated at 29. This spacing is preferably substantially less than the radius of each shield 24, for example one-half to one-fourth of such radius. It should be understood that in some instances only two nozzles can be used, and in other instances, three, four, or many more nozzles can be arranged as a cluster. In general, three or more nozzles are preferred.

Operation of the apparatus and the present method can be explained by reference to FIGS. 1 and 2. Assuming that a gas flow, for example stack or flue gas contains dust particles that are to be removed, the flow is directed into the manifold 21 and divided into a plurality of streams which discharge downwardly from the lower ends 23 of the nozzles 22. It is desirable for the gas flow velocity from the lower end of each nozzle be of the order of 10,000 ft. per minute or higher. The discharging gas streams impinge upon the surface of the liquid body 14, with the result that a pronounced liquid depression is formed immediately below each nozzle. Such impingement exerts a scrubbing action on the gas, with separation and entrapment of dust particles in the liquid. In addition, the gas flowing upwardly and out from each depression 31 picks up and entrains liquid, whereby the gas discharging outwardly through the spaces 31 below the shields 24 is in fact gas with entrained fluid, or in other words, a gas-liquid mixture. The liquid existing in this flow may be in part relatively thin liquid films and in part droplets of varying size. Some turbulence also occurs in the annular spaces 32, with the result that there is effective contact of gas with surfaces of entrained liquid, thus promoting wetting of solid particles with entrainment of solid particles with the liquid. The flow occurring outwardly from the lower end of each nozzle is in effect a radially directed flow with a substantial amount of turbulence. However, the radial velocity decreases due to the expanding flow area. In addition, the velocity decreases radially due to expansion in a vertical direction because of the dished nature of the shields 24.

In FIGS. 1 and 2 the entrained liquid discharging outwardly from the lower end of each nozzle is indicated by short arrows, while the gas flow is indicated by longer arrows. It will be seen that the entrained liquid permeates a space underlying each shield 24 extending for a substantial distance beyond the perimeter of each shield. Gas relatively free of entrained liquid flows upwardly for discharge through conduit 26. The gas-liquid mixture discharging radially from each depression extends beyond the periphery of each shield 24. Thus such discharge from flowing radially from one nozzle intermingles with a like discharge flowing in an opposite direction from an adjacent nozzle, in the regions of the regions 34. Since both gas and entrained particles move into such common regions at relatively high velocities, and in opposite directions, the comingling of the flows creates added turbulence which again promotes efficient and effective scrubbing action.

Previous reference has been made to a new principle utilized in the present invention. The scrubbing action occurring by virtue of impingement of gas upon the surfaces of the depressions 31 is dependent in part upon gas impinging upon the steep side surfaces 31a of the depressions. Also it is dependent in part upon the perimeter of the orifice through which the gas is discharging. It can be demonstrated mathematically that when, say, four nozzles are used to provide a desired total cross-sectional flow area, the sum of the perimeters of the four orifices is greater than a single discharge orifice of the same cross-sectional flow.

It can also be shown that the surface area of the depressions made by the gas flow through the four nozzles is greater than that of the single depression caused when a single nozzle of equivalent discharge area is used.

According to my observations, the additional perimeter length and surface area of the depressions gained by the use of a plurality of nozzles results in more efficient and effective scrubbing action compared to the use of a single orifice, even though the discharging velocity for impingement against the liquid is the same. The longer perimeter and surface area of the depressions provided by multiple nozzles serves to deliver a greater percentage of the discharging gas against the side inclined surface 31a where the scrubbing action is highly effective due to the arcute angle between the direction of the gas flow and the side surface 31a.

Because of more efficient scrubbing action obtained by use of a plurality of nozzles, it is possible to construct apparatus for a given capacity which is relatively compact and inexpensive compared to using a plurality of units of the type disclosed in said South African patent. In addition, the scrubbing action is improved. It has also been found that with the present invention using a plurality of nozzles, the pressure drop across the apparatus for a given capacity is relatively low. Thus for equipment operating at a given capacity, the power consumption is substantially less than when utilizing apparatus of the same capacity but of the type shown in said South African patent.

With respect to saving in cost of manufacture for a given capacity, it may be noted that shields 24 can be mounted directly upon the nozzles 22 without the use of a supplemental mounting structure. This is because the shields need not be of large diameter.

Figure 3:
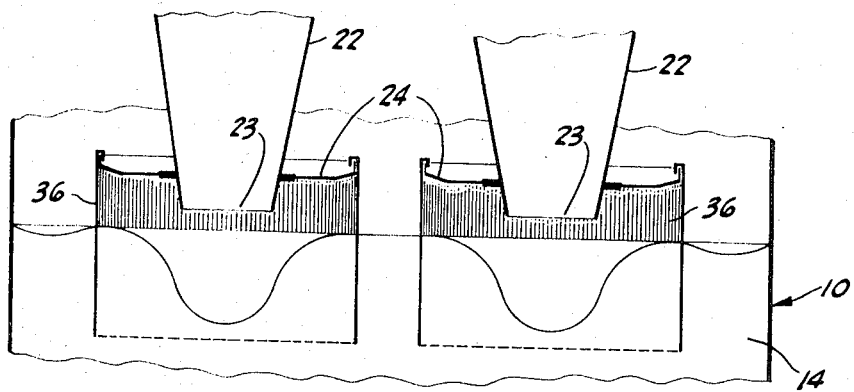
FIG. 3 is a detail showing the addition of impact screens.

In some instances it may be desirable to make use of a screen surrounding the lower end of each of the nozzles and depending from the perimeter of the shield 24. As shown in FIG. 3, such a screen 36 is shown attached to the perimeter of the shield 24 and is of sufficient length that its lower portion is immersed in the body of liquid. This screen can be made of wire mesh or from circumferentially spaced vertical rods. It functions as an impact surface against which entrained liquid impacts, thus causing entrained liquid to be broken up into smaller droplets.

Figure 4:
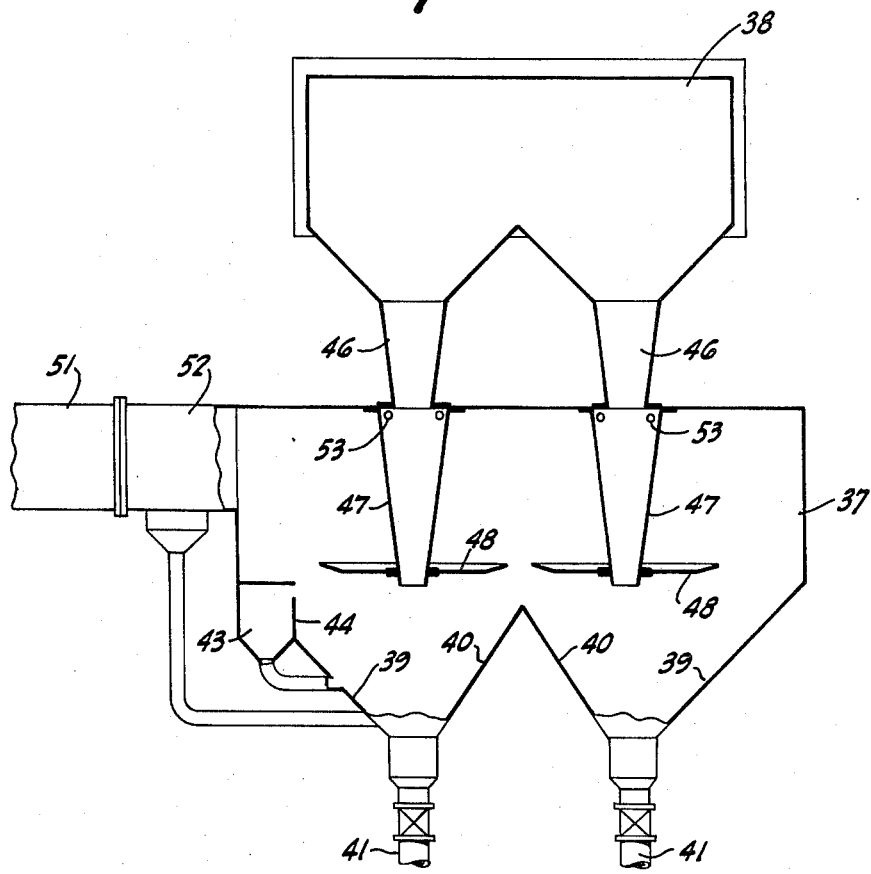
FIG. 4 is an end view in section schematically illustrating apparatus of greater capacity, having a large number of discharging nozzles.
Figure 5:
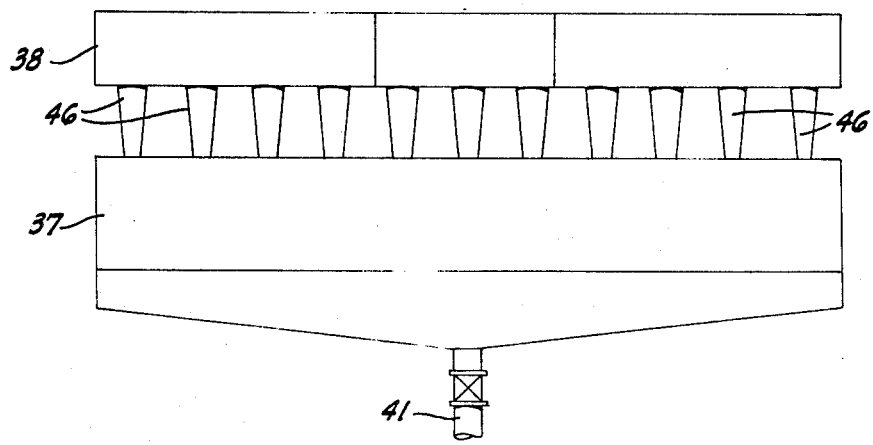
FIG. 5 is a side elevational view of the apparatus shown in FIG. 3.

The larger capacity apparatus shown in FIGS. 4 and 5 makes use of a reservoir 37 which is relatively long compared to its width, and which underlies the manifold or plenum chamber 38. Inclined lower walls 39 and 40 provide settling troughs which connect with the drain pipes 41. One or more overflow boxes 43 can be provided together with an overflow weir 44. The plenum chamber 38 connects with the downwardly extending conduits 46 which in turn communicate with the conical shaped nozzles 47. Each of these nozzles carries an annular shield 48 corresponding to the shields 24 of FIG. 1. The nozzles are shown arranged in two side-by-side rows distributed along the length of the reservoir. Gas is removed from the upper part of the reservoir 37 through one or more conduits 51, each of which may be provided with an eliminator 52. Each of the nozzles 47 may be provided at its upper end with one or more ducts 53 for the tangential introduction of a steam of liquid. Introduction of liquid at this point, which may be the same liquid as that in the reservoir, tends to prevent accumulation of solids in the inner surface of the nozzles and also aids the scrubbing action.

In general, the embodiment illustrated in FIGS. 4 and 5 operates in the same manner as the first described embodiment and the principles involved are the same.

In the foregoing, particular reference has been made to the use of the invention in the separation of dust particles from gases. However, the invention is also applicable where it is desired to remove gaseous polutants from industrial waste gases by scrubbing action with water or other liquid. In some instances, both solid dust particles may be removed, together with absorption of gases. Also the invention can be used where it is desired to effect aeration of a liquid medium as for example, the introduction of atmospheric air or oxygen into water. In addition, the apparatus may be used to promote chemical reactions between liquid and gases. All of the foregoing is embraced in what is commonly known as a scrubbing action.

I claim:

1. A method of effecting scrubbing of gas flow with a liquid, the method making use of a liquid body together with means for directing and discharging gas to be scrubbed against the surface of the liquid body and shielding means overlying the surface of the liquid, the method comprising separating the gas flow into a plurality of gas streams, directing the plurality of gas streams downwardly toward the surface of the liquid body to cause the streams to impinge upon the liquid surface, the flow velocity against the liquid being such as to cause the liquid surface to be depressed in the regions of impingement with entrainment of liquid from the body and with free flight of such entrained liquid from each depressed region, and confining the vertical dimension of spaces surrounding such depressed regions by said shield means whereby flow of gas with entrained liquid occurs in a direction generally transverse to each of said gas streams between the surface of liquid and the corresponding shield means.

2. A method as in claim 1 in which the mixture of gas and liquid discharging from each of said streams is caused to commingle with turbulence with the gas and entrained liquid discharging from at least one adjacent stream.

3. In gas scrubbing apparatus, a reservoir adapted to contain a body of scrubbing liquid, a plurality of gas nozzles disposed within the reservoir above the surface of the liquid body, said nozzles being disposed to discharge gas downwardly upon the surface of the liquid body in spaced regions, manifold means for delivering flow of gas to be scrubbed into said nozzles, and a generally horizontal shield mounted upon each of the nozzles adjacent the lower discharge end of the same, discharge of gas from said nozzles being caused to impinge upon the surface of the liquid and to depress the liquid surface in regions immediately underlying the nozzles, each of said shield means serving to provide a confined annular space between the same and the surface of the liquid, whereby gas after impingement with the liquid body flows outwardly with entrained liquid in directions through the confined annular space transverse to the gas discharge to promote scrubbing action between gas and liquid.

4. Apparatus as in claim 3 in which the shield for each of said nozzles is circular in plan, the shields of adjacent nozzles being spaced apart by a distance which is substantially less than the radius of each shield.

5. Apparatus as in claim 4 in which said nozzles and associated shields are arranged as a cluster within the reservoir.

* * * * *